(12) United States Patent
Semwal et al.

(10) Patent No.: US 10,581,793 B1
(45) Date of Patent: Mar. 3, 2020

(54) ADDRESS RESOLUTION IN VIRTUAL EXTENSIBLE NETWORKS

(71) Applicant: Arista Networks, Inc., Santa Clara, CA (US)

(72) Inventors: Rajesh Semwal, Santa Clara, CA (US); Aparna Karanjkar, Santa Clara, CA (US); Srinivas Subramanian, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 69 days.

(21) Appl. No.: 15/143,396

(22) Filed: Apr. 29, 2016

(51) Int. Cl.
*H04L 29/12* (2006.01)
*H04L 12/46* (2006.01)

(52) U.S. Cl.
CPC .......... *H04L 61/10* (2013.01); *H04L 12/4641* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 7,561,587 B2 * | 7/2009 | Douglass | .............. | H04L 49/602 370/401 |
| 7,881,208 B1 * | 2/2011 | Nosella | ............. | H04L 29/12028 370/220 |
| 8,363,666 B2 * | 1/2013 | Donthamsetty | ..... | H04L 12/4641 370/392 |
| 8,477,782 B2 * | 7/2013 | Timm | ............... | H04L 29/12028 370/252 |
| 8,982,707 B2 * | 3/2015 | Moreno | .................. | H04L 45/64 370/236 |
| 9,083,565 B2 * | 7/2015 | Wang | ..................... | H04L 12/403 |
| 9,210,079 B2 * | 12/2015 | Sridhar | .................. | H04L 45/74 |
| 9,264,362 B2 * | 2/2016 | Hwang | .................. | H04L 47/12 |
| 9,282,033 B2 * | 3/2016 | Devireddy | .............. | H04L 49/70 |
| 9,325,615 B2 * | 4/2016 | Wu | ........................ | H04L 61/103 |
| 9,325,636 B2 * | 4/2016 | Yang | ....................... | H04L 12/18 |
| 9,369,383 B2 * | 6/2016 | Duda | ....................... | H04L 45/74 |
| 9,374,323 B2 * | 6/2016 | Zhang | .................. | H04L 49/354 |
| 9,575,782 B2 * | 2/2017 | Chandrashekhar | ... | H04L 45/741 |
| 9,577,958 B2 * | 2/2017 | Wu | ........................ | H04L 61/103 |
| 9,596,099 B2 * | 3/2017 | Yang | .................. | H04L 12/4641 |
| 9,602,305 B2 * | 3/2017 | Sridhar | .................. | H04L 45/74 |
| 9,621,373 B2 * | 4/2017 | Hwang | .................. | H04L 47/12 |
| 9,654,300 B2 * | 5/2017 | Pani | ....................... | H04L 12/18 |
| 9,686,180 B2 * | 6/2017 | Chu | ........................ | H04L 45/28 |
| 9,733,968 B2 * | 8/2017 | Narasimhamurthy | ....................... | G06F 9/45558 |
| 9,747,249 B2 * | 8/2017 | Cherian | .................. | H04L 45/74 |
| 9,755,965 B1 * | 9/2017 | Yadav | ..................... | H04L 45/54 |

(Continued)

*Primary Examiner* — Gregory B Sefcheck
(74) *Attorney, Agent, or Firm* — Haley Guiliano LLP

(57) ABSTRACT

A network element is provided. The network element includes a tunneling endpoint having a virtual address. The tunneling endpoint is configured to receive an address resolution reply that has a destination MAC (media access control) address matching the virtual address of the tunneling endpoint and is from a network device in a first network that includes the tunneling endpoint. The tunneling endpoint is further configured to send the address resolution reply via an interconnect to a further tunneling endpoint in a further network. A method for address resolution in virtual extensible networks is also provided.

19 Claims, 5 Drawing Sheets

(56) References Cited

U.S. PATENT DOCUMENTS

| | | | | |
|---|---|---|---|---|
| 9,817,695 B2* | 11/2017 | Clark | ................... | G06F 9/4856 |
| 10,003,571 B2* | 6/2018 | Wu | ....................... | H04L 61/103 |
| 10,079,798 B2* | 9/2018 | Du | ........................ | H04L 61/103 |
| 10,110,465 B2* | 10/2018 | Gupta | .................... | H04L 45/08 |
| 10,382,315 B2* | 8/2019 | Barry | ................. | H04L 43/0817 |
| 2014/0195666 A1* | 7/2014 | Dumitriu | ............ | H04L 12/4625 |
| | | | | 709/223 |
| 2015/0215265 A1* | 7/2015 | Lim | ..................... | H04L 61/103 |
| | | | | 370/390 |
| 2015/0281075 A1* | 10/2015 | Park | ..................... | H04L 45/745 |
| | | | | 370/392 |
| 2016/0294769 A1* | 10/2016 | Song | .................. | H04L 12/4641 |
| 2017/0279722 A1* | 9/2017 | Amulothu | ............. | H04L 5/0053 |
| 2017/0295130 A1* | 10/2017 | Mahajan | ............... | H04L 61/103 |
| 2017/0310586 A1* | 10/2017 | Lin | ........................ | H04L 45/54 |

\* cited by examiner

ADDRESS RESOLUTION IN VIRTUAL EXTENSIBLE NETWORKS

BACKGROUND

Virtualized networks, or network virtualization, allow one or more virtual local area networks (VLANs) to be defined within or as an overlay to a local area network (LAN). One popular protocol and technology for doing so, VXLAN (virtual extensible LAN), tunnels a layer 2 network over a layer 3 network. In order to resolve virtual addresses used in a virtual network, networked devices use an address resolution protocol (ARP). ARP is the protocol to find the physical MAC (media access control) address corresponding to an IP (Internet protocol) address of a physical device. In the context of ARP request and reply packets, the IP addresses and MAC address are used. An ARP request, which is a type of address resolution request for virtual addresses, is sent out, and an ARP reply, which is a type of address resolution reply, comes back. This resolves a virtual address to a physical address, so that a packet addressed to a virtual address can be sent to the physical address. A VARP-MAC (virtual address resolution protocol-media access control) address is a virtual media access control (MAC) address used in ARP. The VARP-MAC address is used as a virtual-router MAC address for ARP requests and GARP (generic attribute registration protocol). A virtual network identifier (VNI) maps a VLAN to the VXLAN. When there is a need to route traffic between two VLANs, a switched virtual interface (SVI) provides a default gateway for a VLAN. The SVI represents the routing interface in a given VLAN, so the traffic in that VLAN can be routed by the SVI. Using one VARP-MAC is desired for homogeneity, in a homogeneous overlay extension of a VNI across a data center interconnect (DCI). However, although VXLAN allows two or more VLANs or other networks to couple together via a data center interconnect, using VNIs, SVIs and a VARP-MAC used in common across the datacenters, there is a problem with virtual address resolution across the multiple datacenters. An ARP request can be sent in one VLAN in a datacenter that is extended across a DCI to multiple datacenters, but the ARP reply from remote datacenter will not return to the VLAN in the originating datacenter. A representative example situation is described below with reference to FIG. 1. It is within this context that the embodiments arise.

SUMMARY

In some embodiments, a network element is provided. The network element includes a tunneling endpoint having a virtual address. The tunneling endpoint is configured to receive an address resolution reply (ARP) that has a destination MAC (media access control) address matching the virtual Router MAC address of the SVI on the tunneling endpoint and the address resolution reply is from a network device in a first network that includes the tunneling endpoint. The tunneling endpoint is further configured to send the address resolution reply via an interconnect to a further tunneling endpoint in a further network.

In some embodiments, a tangible, non-transitory, computer-readable media having instructions thereupon which, when executed by a processor, cause the processor to perform a method. The method includes receiving an address resolution reply at a tunneling endpoint, wherein the address resolution reply has a destination MAC address that matches a virtual Router MAC address of the tunneling endpoint, and wherein the address resolution reply is from a network device in a first network that includes the tunneling endpoint. The method includes sending the address resolution reply via an interconnect to a further tunneling endpoint in a further network, wherein the further tunneling endpoint couples the interconnect to the further network.

In some embodiments, a processor-based method for address resolution in virtual extensible networks is provided. The processor based method includes receiving, at a first tunneling endpoint an address resolution reply having a destination MAC address matching a virtual Router MAC address of the first tunneling endpoint, from a network device in a first network that includes the first tunneling endpoint and the network device, and sending the address resolution reply from the first tunneling endpoint, via an interconnect, to a second tunneling endpoint in a second network.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A problem and solution, in the form of a network element and a related method, are described below as relevant to address resolution in virtual extensible networks using a homogeneous overlay extension of a virtual network identifier (VNI) across an interconnecting network. Although embodiments are disclosed that apply to specific protocols and networks, it should be appreciated that the solution may be extended to or integrated with various types of networks and protocols.

On a VTEP or virtual tunneling endpoint, there are typically more than one VLANs (virtual local area networks), where each VLAN is mapped to a unique VNI. So, for example, VLAN1 maps to VNI1 while VLAN2 maps to VNI2. If there is a need to route the packets from VLAN1 to VLAN2 on a VTEP, SVIs (switched virtual interfaces) are created for both VLAN1 and VLAN2 on the VTEP. Then a Virtual IP address and a Virtual Router MAC (VRM), which could be a VARP-MAC or virtual address resolution protocol media access control address in some embodiments, is configured for each SVI. In this example VIP and VMAC1 are assigned to SVI-VLAN1, while VIP2 and VMAC2 are assigned to SVI-VLAN2. In most deployments VMAC1 and VMAC2 will be the same address value (i.e., VMAC 1 is equal to VMAC2). In a homogeneous network, all VTEPs will use the same Virtual IP address and Virtual Router MAC for an SVI created for a given VNI. This is the case even for VTEPs spread across more than one data centers. So if, as VTEP1 uses (VIP1,VMAC) for SVI-VLAN1, (VIP2, VMAC) for SVI-VLAN2, VTEP2 also uses (VIP1,VMAC) for SVI-VLAN1, (VIP2,VMAC) for SVI-VLAN2. As a part of routing a packet from VLAN1 to VLAN2 (or in other words from VNI1 to VNI2), a VTEP can send an ARP packet to find the physical MAC address corresponding to the destination IP address in the packet. If a packet is routed from VLAN1/VNI1 into VLAN2/VNI2, the generated ARP request for destination IP will use the VMAC with respect to SVI-VLAN2 as the source/sender MAC address in the ARP request. The ARP reply from the destination (which may be behind a VTEP in a local or remote data center) will have the destination MAC address set to VMAC. The first hop VTEP of the responding destination will also have the SVI-VLAN2 with the (VIP2, VMAC) configuration. This VTEP will consume the ARP reply but will also replicate the reply to all the other VTEPs in the local data center. This replicated reply lands on the NEL (network edge leaf) VTEP of the local data center. The NEL VTEP then relays this ARP reply to the NEL VTEPs in other data centers either using the ARP relay list approach (see FIG. 4) or using the flooding of the ARP reply with either a flood list (see FIG. 3) or a broadcast address (see after the description of FIG. 4), as further described in examples and embodiments below with reference to FIGS. 1-5. It should be appreciated the terms VRM and VMAC may be used interchangeably in the embodiments described below.

Figure 1:
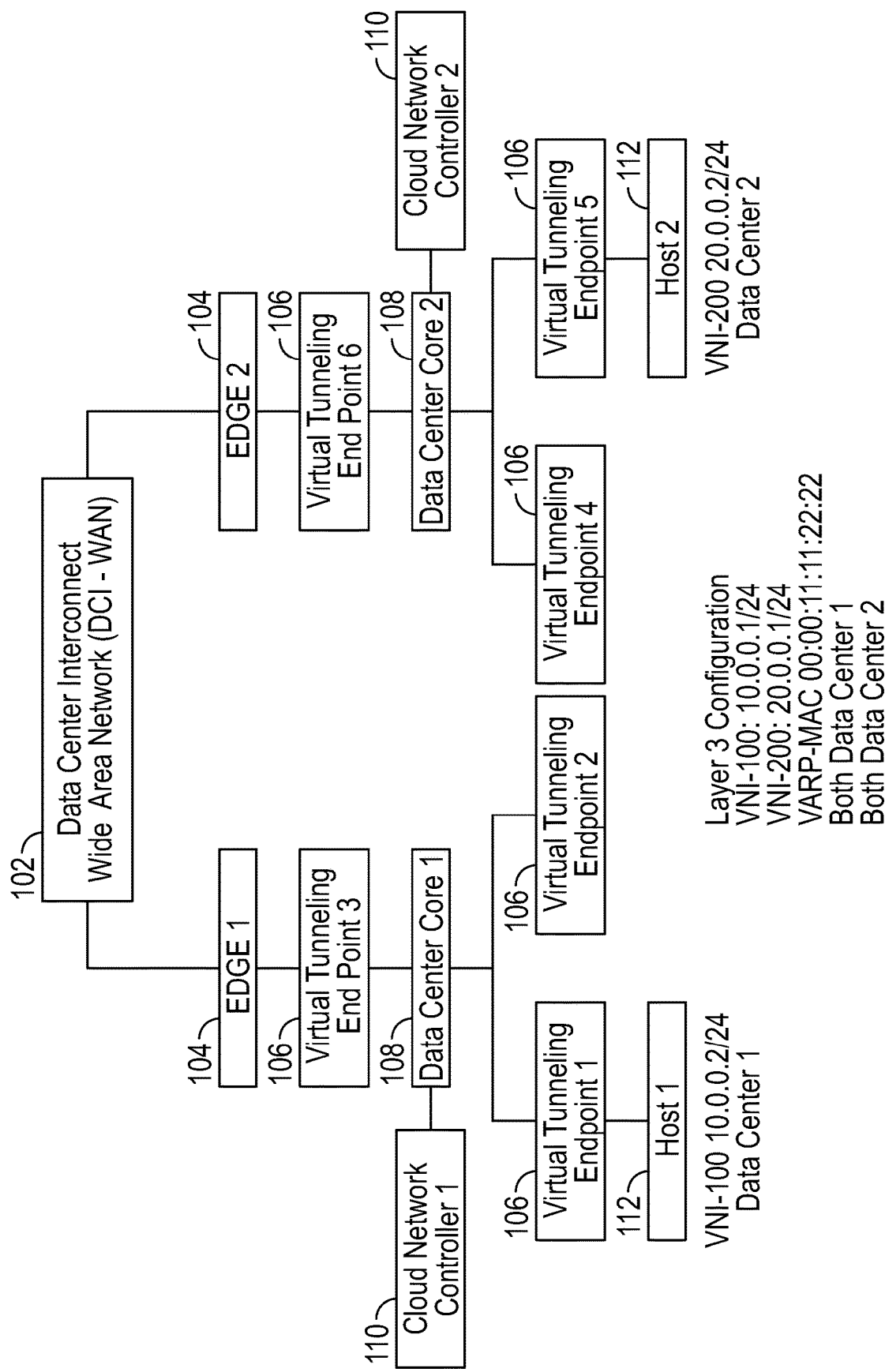
FIG. 1 is an example showing two virtual local area networks (VLANs) connected by an interconnecting network, in an overlay extension that uses a virtual address in common across the two virtual local area networks in accordance with some embodiments.

FIG. 1 is an example showing two virtual local area networks (VLANs) connected by an interconnecting network 102, in an overlay extension that uses a virtual address in common across the two virtual local area networks. In the scenario depicted, there are two data centers, data center 1 (on the left) and data center 2 (on the right), each with one or more networks or virtual networks, or a set of networks or virtual networks, or an extended virtual local area network, supported by a data center core 108 and a cloud network controller 110. The data center core 108 in each data center may be implemented with various combinations of physical and virtualized network elements supported by physical network devices, orchestrated by VCS (VXLAN control services) and CVX (CloudVision Exchange™) or other cloud network controller 110. It is desired to connect the data centers, more specifically connect the virtual local area networks of the data centers, using an interconnecting network 102, in this scenario a data center interconnect wide area network (DCI-WAN). The interconnecting network 102 could be implemented using a wide variety of network technologies and is not otherwise limited to a specific set of network devices.

Each data center and associated virtual local area network has a number of virtual tunneling endpoints 106. In one embodiment, each virtual local area network is a VXLAN (virtual extensible local area network) that is a virtualized network implemented as an overlay over a local area network (LAN) implemented with physical network devices. Each of the virtual tunneling endpoints 106 is a VXLAN tunnel endpoint (VTEP) device that can communicate packets through a VXLAN tunnel to or from other virtual tunneling endpoints 106, e.g., by transmitting or receiving VXLAN-encapsulated packets. A virtual tunneling endpoint 106 can be implemented as a physical device or a virtual device implemented using physical components. Being a network device, a virtual tunneling endpoint 106 can also communicate with other network devices, such as hosts 112, edge devices 104, servers (see FIG. 2), etc.

In this scenario, with the two virtual networks connected by the interconnecting network 102, it is desired to use a virtual address in common across the two virtual local area networks. In one embodiment, the same Virtual Router MAC (VRM) is assigned as the virtual address to use for address resolution in either virtual local area network and across both virtual local area networks. In some embodiments, the Virtual Router MAC or VMAC is the VARP-MAC (virtual address resolution protocol media access control address) as an address. This configuration makes a homogeneous overlay extension of a virtual network identifier across the interconnecting network 102, and over the virtual local area networks. The Virtual Router MAC address is common amongst all virtual tunneling endpoints, i.e., is shared by all virtual tunneling endpoints. Address assignments in this example are as follows. The two virtual local area networks are identified by VNI-100 and VNI-200, respectively. Both data centers have VNI-100 and VNI-200 as identifiers. The layer 3 (OSI, or open systems interface model) configuration for both data center 1 and data center 2, i.e., for both of the VLANs or VXLANs, is VNI-100: 10.0.0.0.1/24, VNI-200: 20.0.0.1/24, and VARP-MAC 00:00:11:11:22:22. This layer 3 configuration information is pushed to or otherwise made available to each virtual tunneling endpoint 106, for example by the respective data center cores 108 under guidance of the respective cloud network controllers 110, or by administrator configuration.

Continuing with FIG. 1, each data center has a special virtual tunneling endpoint 106 at the edge of the network, called a network edge leaf (NEL) or network edge leaf virtual tunneling endpoint (NEL VTEP), connected to an edge device 104 that implements an edge node connected to the interconnecting network 102. The combination of the NEL VTEP and the edge device 104 works as a data center interconnect (DCI) module (see FIG. 2) that is used to connect one data center to another via the interconnecting network 102. Overlay traffic traversing the link between the network edge leaf virtual tunneling endpoint 106 and the edge device 104 is unencapsulated, which may also be referred to as "naked". Each of the edge devices 104 (e.g., edge 1 or edge 2) can VXLAN encapsulate unencapsulated traffic received from an attached network edge leaf virtual tunneling endpoint 106 should the need arise. Keeping network edge leaf virtual tunneling endpoints 106 and edge devices 104 or edge nodes separate and connecting them via the unencapsulated ("naked") link allows the use of two different VTEP flood lists for inter-data center (i.e., between or among data centers) versus intra-data center (i.e., internal to one data center) overlay traffic.

Assuming the use of direct VXLAN routing in both data centers, all virtual tunneling endpoints 106 have routing information to all other virtual tunneling endpoints 106. All the virtual tunneling endpoints 106, including the network edge leaf virtual tunneling endpoints 106, will have SVIs (i.e., switched virtual interfaces) configured for every virtual network identifier that needs routing. For a homogeneous overlay extension of a virtual network identifier across the interconnecting network 102 or data center interconnect, the virtual tunneling endpoints 106 in both data centers are assigned the same virtual IP (Internet protocol) address and the same router-MAC address for a switched virtual interface created for the virtual network identifier. In the example in FIG. 1, the VNI-100 and VNI-200 are configured with the same IP addresses (e.g., 10.0.0.1/24 and 20.0.0.1/24) in both data center 1 and data center 2. Similarly, both the data centers use the same router-MAC (also known as the VARP-MAC address, e.g., 00:00:11:11:22:22).

An example of packets being routed between subnets that also require the packet to be sent from one data center to another is as follows. If the host 112 identified as host 1, attached to the virtual tunneling endpoint 106 identified as virtual tunneling endpoint 1 in data center 1 pings the host 112 identified as host 2 attached to the virtual tunneling endpoint 106 identified as VTEP 5 in data center 2, the virtual tunneling endpoint 106 identified as VTEP 1 will do "direct" routing of the ping request packet from host 1. As a result, the virtual tunneling endpoint 106 identified as VTEP 1 will send an address resolution protocol request for the host 2 IP address in VNI-200, in order to find the IP address for host 2. This ARP request will have the VARP-MAC as the source MAC address (e.g., in the header of the packet) and as the sender hardware address (SHA inside the ARP packet). This address resolution protocol request, which necessarily precedes the sending of the ping request packet, is flooded in data center 1 (via head-end replication, or HER) by the virtual tunneling endpoint 106 identified as VTEP 1. In head-end replication, serial unicast packets are sent to all other members, using a shortest path first tree. The network edge leaf virtual tunneling endpoint 106, identified as the VTEP 3 in data center 1 receives the address resolution protocol request during the flooding or head-end replication, decaps the packet (i.e., removes encapsulation in the header also referred to as unencapsulation), and floods the packet with the address resolution protocol request towards data center 2, via the interconnecting network 102. The unencapsulated address resolution protocol request is received unencapsulated or "naked" by the network edge leaf virtual tunneling endpoint 106 identified as VTEP 6, which in turn encapsulates the address resolution protocol request packet and floods it, using head-end replication, to all of the other virtual tunneling endpoints 106 in data center 2. In this manner, the address resolution protocol request is received by the host 112 identified as host 2. Then, the host 2 sends the address resolution protocol reply, destined to the VARP-MAC address (since this is identified as the sender hardware address of the ARP request). The virtual tunneling endpoint 106 identified as VTEP 5 attached to the host 2 then head-end replicates this address resolution protocol reply, so the network edge leaf virtual tunneling endpoint identified as VTEP 6 in the data center 2 receives the address resolution protocol reply.

The virtual tunneling endpoint identified as VTEP 6 in FIG. 1 has a switched virtual interface configured for VNI-200 with the same VARP-MAC address as the destination MAC (DMAC) address in the address resolution protocol reply, and assumes the address resolution protocol reply is destined for VTEP 6 and other virtual tunneling endpoints 106 in data center 2. Thus, VTEP 6 consumes the reply and does not forward the address resolution protocol reply to data center 1 via the interconnecting network 102. Unfortunately, the address resolution protocol reply, or resolution for the host 2 IP address, never succeeds in reaching the virtual tunneling endpoint 106 identified as VTEP 1, which originated the address resolution protocol request. In addition, the ping from host 1 to host 2 also fails, since no address resolution for the address of host 2 is ever received back for use in sending the ping and further communications. In the above description, the use of a homogeneous overlay extension of a virtual network identifier across an interconnecting network causes resolution of a virtual address to a physical address to fail. When the address resolution request crosses from one virtual network over an interconnecting network 102 to another virtual network, the address resolution reply does not get forwarded back over the interconnecting network 102 to the virtual network from which the address resolution request originated.

The solution to the above problem is to equip each network edge leaf virtual tunneling endpoint 106, in each virtual network (e.g., VLAN or VXLAN) that the homogeneous overlay extension couples via the interconnecting network 102, with a list 204 and instructions for how and when to use the list for forwarding address resolution replies. This mechanism, which could be implemented in software executing on a processor, firmware, hardware, or combinations thereof, is shown in FIG. 2, and embodiments of the lists are shown in FIGS. 3 and 4.

Figure 2:
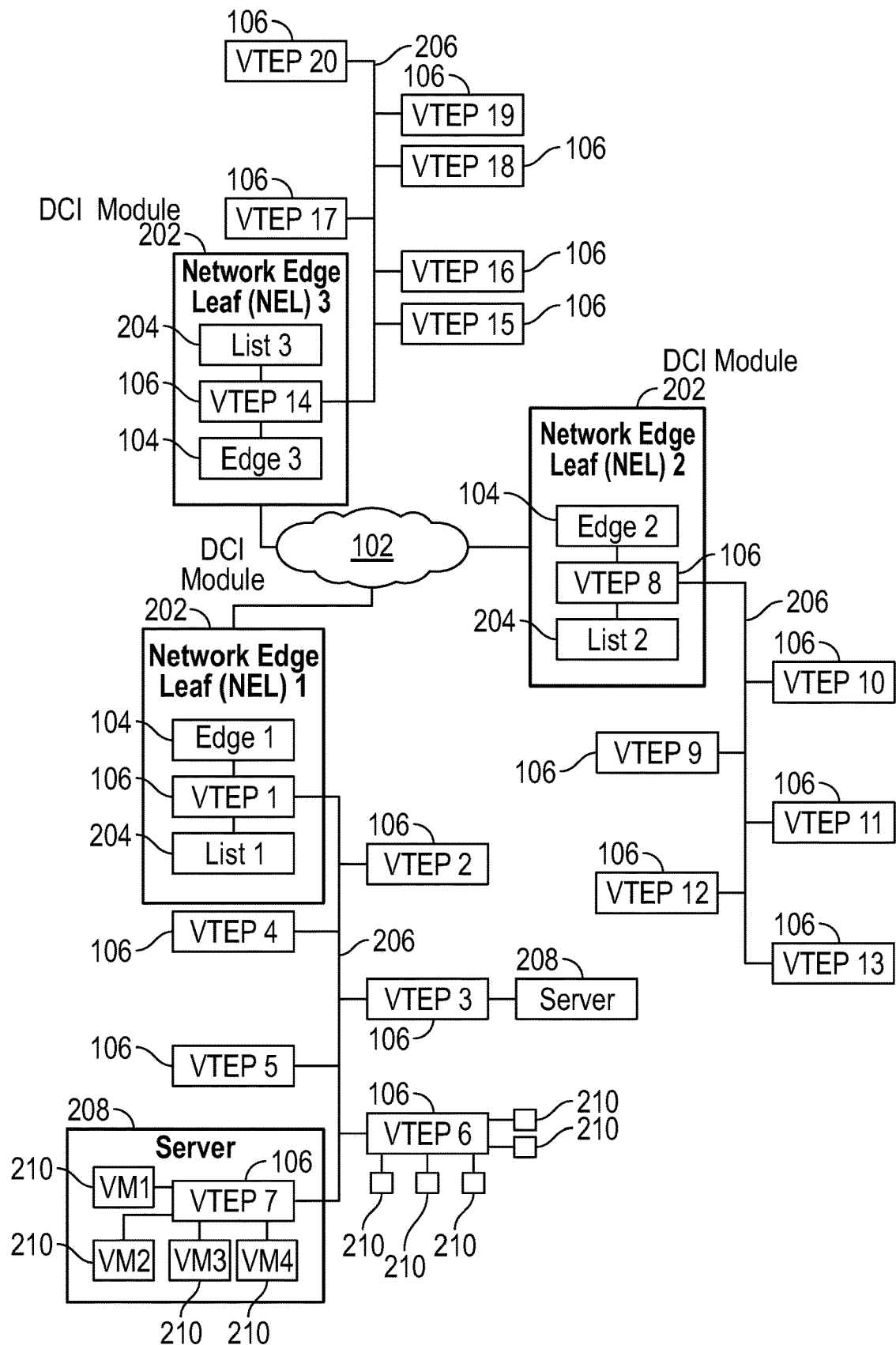
FIG. 2 is an example showing three virtual local area networks connected by an interconnecting network, with virtual tunneling endpoints using lists to forward address resolution replies over the interconnecting network in accordance with some embodiments.

FIG. 2 is an example showing three data centers, with virtual local area networks 206 or other types of network(s) or extended virtual local area network(s), etc., connected by an interconnecting network 102, with virtual tunneling endpoints 106 using lists 204 to forward address resolution replies over the interconnecting network 102. Various arrangements and connections of virtual tunneling endpoints 106 and virtual machines 210 and servers 208 are also shown. A server 208 is attached to the virtual tunneling endpoint 106 identified as VTEP 3. Virtual machines 210 are attached to another virtual tunneling endpoint 106 identified as VTEP 6. One of the virtual tunneling endpoints 106, identified as VTEP 7, and several virtual machines 210, identified as VM 1, VM 2, VM 3 and VM 4, are implemented in a server 208. Other virtual tunneling endpoint 106 are depicted without attachments, but could have virtual machines 210, servers 208, hosts 112, etc., attached to them, or be implemented in any of these, in combinations and variations that are readily devised. The list 204 can be generated and pushed to each network edge leaf virtual tunneling endpoint 106, for example by the cloud network controller 110 or the data center core 108 (see FIG. 1), or otherwise made available and accessible. Alternatively, the list 204 could be configured by an administrator.

Still referring to FIG. 2, the mechanism for forwarding address resolution replies works to solve the problem of address resolution replies not being forwarded over the interconnecting network 102. Each network edge leaf virtual tunneling endpoint 106 (e.g., VTEP 1, VTEP 8, and VTEP 14 in FIG. 2, or VTEP 3 and VTEP 6 in FIG. 1) has the same virtual IP address and VRM for a virtual network identifier as all virtual tunneling endpoints 106 in all virtual networks coupled by the interconnecting network 102 in the homogeneous overlay. For example, the VARP-MAC could be used as the virtual address or Virtual Router MAC (VMAC). The address resolution reply, e.g., an ARP reply, has the virtual address of the homogeneous overlay network as a destination address, for example a DMAC (in the packet header) equal to the VARP-MAC, which is the address assigned to the VRM or VMAC. The destination MAC address of the address resolution reply thus matches the virtual address of the network edge leaf virtual tunneling endpoint 106. When a network edge leaf virtual tunneling endpoint 106 receives such an address resolution reply, the network edge leaf virtual tunneling endpoint 106 obtains the source address, for example a source IP address, from the header of the packet (e.g., the ARP reply) and checks to see whether or not this source address is on the list 204. Then, depending upon what type of list 204 is present (see variations in FIGS. 3 and 4) and depending upon whether the source address is in the list 204, the network edge leaf virtual tunneling endpoint 106 determines whether or not to forward the address resolution reply over the interconnecting network 102 to other network edge leaf virtual tunneling endpoint(s) 106.

Figure 3:
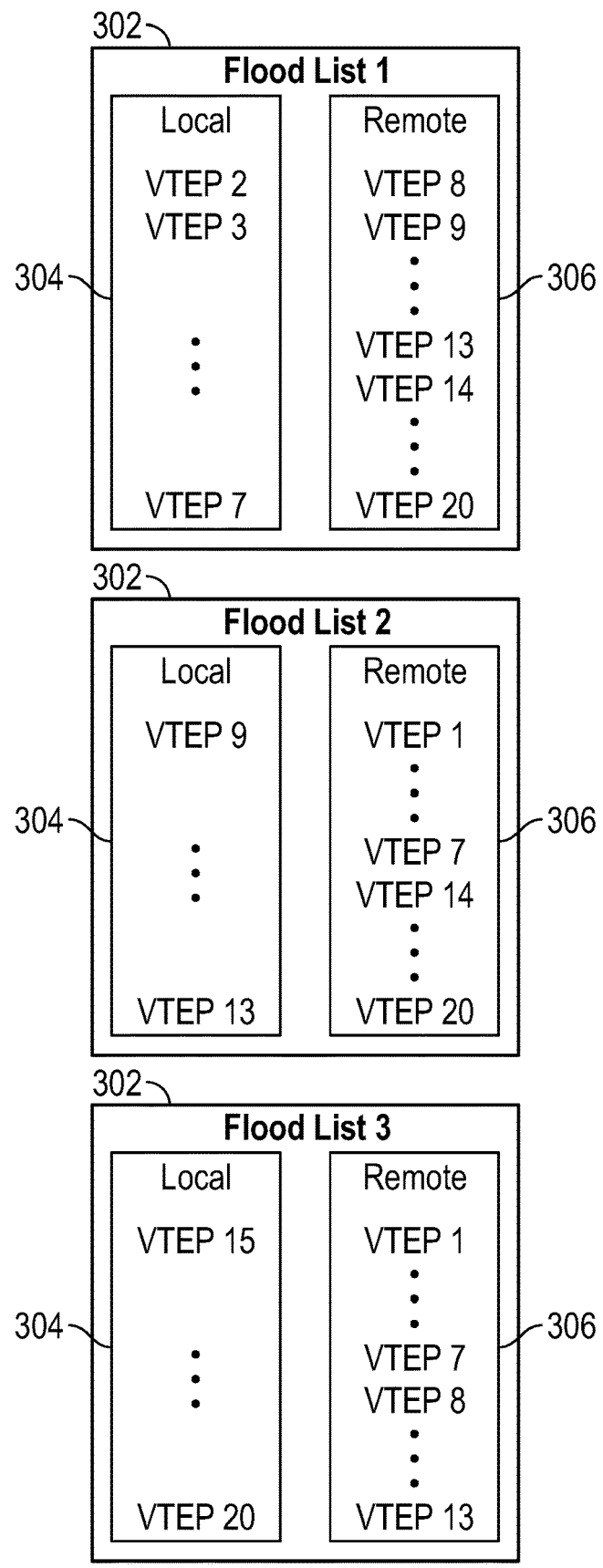
FIG. 3 is an example of flood lists that the virtual tunneling endpoints at the edges of networks, as shown in FIGS. 1 and 2, use to forward address resolution replies, in accordance with some embodiments.
Figure 4:
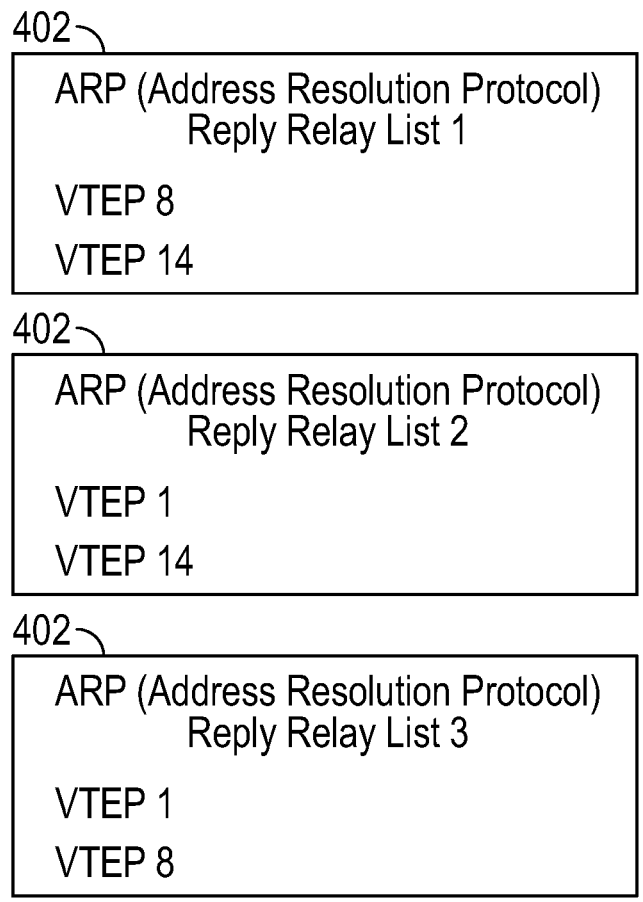
FIG. 4 is an example of address resolution reply relay lists that the virtual tunneling endpoints at the edges of networks, as shown in FIGS. 1 and 2, use to forward address resolution replies, in accordance with some embodiments.

FIG. 3 is an example of flood lists 302 that the virtual tunneling endpoints 106 at the edges of networks use to forward address resolution replies, in one embodiment. Various embodiments use various versions of flood lists 302, or no flood lists at all. Some embodiments use a flood list 302 in each virtual tunneling endpoint 106 that contains or references all local data center virtual tunneling endpoints 106 and all remote data center virtual tunneling endpoints 106. Such embodiments cannot be used to determine if an ARP reply came from a local data center versus a remote data center. Some embodiments do not use flood lists 302. Some embodiments use just a local flood list 304. Some embodiments use just a remote flood list 306. Continuing with the example, the flood list 302 for each network edge leaf virtual tunneling endpoint 106 has a local flood list 304 and a remote flood list 306. On the local flood list 304 are addresses (e.g., IP addresses) for virtual tunneling endpoints 106 within the local data center that are in the same virtual local area network 206 as the network edge leaf virtual tunneling endpoint 106 to which that flood list 302 belongs. On the remote flood list 306 are addresses (e.g., IP addresses) for virtual tunneling endpoints 106 in virtual networks belonging to the homogeneous overlay network, other than the virtual local area network 206 to which the network edge leaf virtual tunneling endpoint 106 and that flood list 302 belong.

More specifically, FIG. 3 shows a flood list 302 identified as flood list 1, and this would be the flood list version of the list 204 shown as list 1 in network edge leaf 1 VTEP 1. The local flood list 304 in flood list 1 lists addresses (e.g., IP addresses) of virtual tunneling endpoints 106 identified as VTEP 2 through VTEP 7, since these are local to the same virtual local area network 206 as the VTEP 1. The remote flood list 306 in flood list 1 lists addresses of virtual tunneling endpoints 106 identified as VTEP 8 through VTEP 13, from one of the other virtual local area networks 206, and VTEP 14 through VTEP 20 from yet another of the virtual local area networks 206. Relatedly, flood list 2 for network edge leaf 2 VTEP 8 has a local flood list 304 with addresses for VTEP 9 through VTEP 13 (on the same virtual local area network 206 as VTEP 8) and a remote flood list 306 with addresses for VTEP 1 through VTEP 7 and VTEP 14 through VTEP 20 (on virtual local area networks 206 in the homogeneous overlay other than the same virtual local area network 206 as VTEP 8). Flood list 3 for network edge leaf VTEP 14 has a local flood list 304 with addresses for VTEP 15 through VTEP 20 (on the same virtual local area network 206 as VTEP 14) and a remote flood list 306 with addresses for VTEP 1 through VTEP 7 and VTEP 8 through VTEP 13 (on virtual local area networks 206 in the homogeneous overlay other than the same virtual local area network 206 as VTEP 14).

An algorithm for using the flood list 302 of FIG. 3 is described below in one embodiment. A network edge leaf virtual tunneling endpoint 106 can receive two types of address resolution (e.g., ARP) replies over a tunnel (e.g., the tunnel between two virtual tunneling endpoints 106). One type of address resolution reply is a reply that originates in the local data center or network, i.e., the virtual local area network 206 to which the network edge leaf virtual tunneling endpoint 106 of interest belongs. The other type of address resolution reply is a reply that is relayed to the network edge leaf virtual tunneling endpoint 106 of interest by another network edge leaf virtual tunneling endpoint 106 in another data center or network, i.e. a virtual local area network 206 other than the virtual local area network 206 to which the network edge leaf virtual tunneling endpoint 106 of interest belongs. Only the locally originated address resolution replies destined to the VRM or VMAC that has been assigned the VARP-MAC must be relayed to other data centers in some embodiments. The receiving network edge leaf virtual tunneling endpoint 106 checks the source address (e.g., an IP address) of the received address resolution reply against the flood list 302 particular to that receiving network edge leaf virtual tunneling endpoint 106. If the sourceIP address in the VXLAN encapsulation header of the received ARP reply, is not in the local flood list 304, or is in the remote flood list 306, the reply must have been relayed by another data center, i.e., by a network edge leaf virtual tunneling endpoint 106 in another virtual local area network 206 in the homogeneous overlay. If the source address is on the local flood list 304 or is not on the remote flood list 306, the reply must have originated in the same virtual local area network 206 as the receiving network edge leaf virtual tunneling endpoint 106. The receiving network edge leaf virtual tunneling endpoint 106 forwards locally originating address resolution replies over the interconnecting network 102, to each of the virtual tunneling endpoints 106 listed in the remote flood list 306. That is, the receiving network edge leaf virtual tunneling endpoint 106 sends a copy of the address resolution reply to each and every virtual tunneling endpoint 106 on the remote flood list 306, using packet encapsulation and tunneling, over the interconnecting network 102 in some embodiments.

FIG. 4 is an example of address resolution reply relay lists 402 that the virtual tunneling endpoints 106 at the edges of networks use to forward address resolution replies, in one embodiment. The address resolution reply relay list 402 for each network edge leaf virtual tunneling endpoint 106 has addresses (e.g., IP addresses) for network edge leaf virtual tunneling endpoints 106 in other virtual networks 206 belonging to the homogeneous overlay network. That is, for a specific network edge leaf virtual tunneling endpoint 106, the corresponding address resolution reply relay list 402 has addresses of network edge leaf virtual tunneling endpoints 106 in virtual local area networks 206 other than the virtual local area network 206 to which the specific network edge leaf virtual tunneling endpoint 106 belongs.

For example, FIG. 4 shows an address resolution reply relay list 402 identified as ARP reply relay list 1, and this would be the address resolution reply relay list version of the list 204 shown as list 1 in network edge leaf 1 VTEP 1. ARP reply relay list 1 lists addresses (e.g., IP addresses) of virtual tunneling endpoints 106 identified as VTEP 8 and VTEP 14, since these are network edge leaf virtual tunneling endpoints 106 from virtual local area networks 206 other than the virtual local area network 206 that has VTEP 1. Relatedly, ARP reply relay list 2 for network edge leaf 2 VTEP 8 has addresses for VTEP 1 and VTEP 14, the network edge leaf virtual tunneling endpoints 106 from virtual local area networks 206 other than the virtual local area network 206 that has VTEP 8. ARP reply relay list 3, for network edge leaf 3 VTEP 14 has addresses for VTEP 1 and VTEP 8, the network edge leaf virtual tunneling endpoints 106 from virtual local area networks 206 other than the virtual local area network 206 that has VTEP 14.

An algorithm for using the address resolution reply relay list 402 of FIG. 4 is explained in more detail below. A network edge leaf virtual tunneling endpoint 106 that receives an address resolution reply checks the source address (e.g., an IP address) of the received address resolution reply against the address resolution reply relay list 402 particular to that receiving network edge leaf virtual tunneling endpoint 106. If the source IP address in the VXLAN encapsulation header of the received ARP reply is on that address resolution reply relay list 402, the reply must have been relayed by another data center, i.e., by a network edge leaf virtual tunneling endpoint 106 in another virtual local area network 206 in the homogeneous overlay. If the source address is not on that address resolution reply relay list 402, the reply must have originated in the same virtual local area network 206 within the local data center as the receiving network edge leaf virtual tunneling endpoint 106. The receiving network edge leaf virtual tunneling input 106 forwards locally originating address resolution replies over the interconnecting network 102, to each of the virtual tunneling endpoints 106 listed in the address resolution reply relay list 402. Those virtual tunneling endpoints 106, which are network edge leaf virtual tunneling endpoints 106 in their respective virtual local area networks 206, are responsible for flooding the address resolution reply in their respective virtual local area networks 206, for example by each using a local flood list.

In some embodiments, any time a network edge leaf virtual tunneling endpoint 106 receives an ARP reply destined to its VARP-MAC, VMAC or VRM, the network edge leaf virtual tunneling endpoint encapsulates the reply and sends the encapsulated reply to the list of virtual tunneling endpoints 106 present in the ARP reply relay list. When this relayed ARP reply is received by the network edge leaf virtual tunneling endpoint 106 of a remote data center, that virtual tunneling endpoint 106 decaps (i.e., removes encapsulation from) the relayed ARP reply and replicates this to all of the other virtual tunneling endpoints 106 in that local data center.

With reference to FIGS. 1-4, details of feature usage of various approaches are discussed below. Checking a source IP of a received ARP reply against an ARP reply relay list allows for identification of other ARP relay network edge leaf virtual tunneling endpoints 106. The ARP relay list could be configured at the cloud network controller 110, e.g., CVX™ on the VXLAN control service. For non-CVX environments, this feature could be supported by configuring directly at each network edge leaf virtual tunneling endpoint 106. Since the same VARP-MAC is used in two or more data centers (see FIG. 1), the learning of VARP-MAC addresses will ping-pong between local versus remote on edge 1 and edge 2 nodes, assuming the DCI uses VXLAN overlays for connectivity. In order to reduce this churning, local static MAC address could be programmed for the VARP-MAC on both of the edge nodes to make it point to a "naked" (unencapsulated) link towards an attached network edge leaf virtual tunneling endpoint 106. Edge nodes are not expected to ever receive a packet ("naked" or tunneled) with a destination of VARP-MAC, based on the assumption that each data center supports VXLAN direct routing and hence should never leak such a packet to the edge node. The network edge leaf virtual tunneling endpoint 106 IP address of each data center needs to be leaked into the data center interconnect wide area network core (see interconnecting network 102 in FIG. 1).

Still referring to FIGS. 1-4, some advantages of the address resolution reply relay list approach are as follows. Only the network edge leaf virtual tunneling endpoint 106 in a data center needs to be configured with the address resolution reply relay list. The configuration model is thus scalable, as the number of virtual tunneling endpoints 106 in a data center has no impact on the address resolution reply relay list configuration. Virtual tunneling endpoints 106 that are not network edge leaf virtual tunneling endpoints 106 can be freely added or deleted, or have IP addresses changed, with no impact to the address resolution reply relay list. Only the network edge leaf virtual tunneling endpoint 106 IP address of a data center needs to be leaked into the data center interconnect wide area network core. This is unlike the flood list approach, where the virtual tunneling endpoint 106 IP address of each virtual tunneling endpoint 106 in the local data center would need to be leaked into the data center interconnect wide area network core. The edge device 104 identified as edge 1 should tunnel the overlay packet all the way to edge 2 over the data center interconnect wide area network, so that the packet is unencapsulated or decapped only at edge 2 where the packet is forwarded "naked" (unencapsulated) to the network edge leaf virtual tunneling endpoint 106 identified as VTEP 6 of data center 2, and vice versa. Otherwise, any intermediate node de-encapsulating (or decapsulating) the overlay packet may see MAC move churn, if it learns the VARP-MAC.

In the flood list approach, described with reference to FIG. 3, any time a virtual tunneling endpoint 106 is added, deleted or updated with a new IP address, the flood list for each of the virtual tunneling endpoints 106 in all of the data centers should be changed. Each virtual tunneling endpoint 106 in a local data center replicating to all virtual tunneling endpoints 106 in remote data centers results in unnecessary copies of BUM (broadcast, unknown destination address, multicast traffic on a network) packets on the data center interconnect link. In the case of CVX presence where CVX is used for learning the remote mac addresses in a data center, the virtual tunneling endpoints 106 in the data center will not be able to learn the hosts from other data centers since the BUM packets will get directly head-end replicated to remote virtual tunneling endpoints 106. Thus, anytime a virtual tunneling endpoint 106 in a data center wants to reach a host in a remote data center, the respective packet will always get head-end replicated to all of the virtual tunneling endpoints 106 in all of the data centers.

A further embodiment, which uses a broadcast address, has advantages over both the address resolution reply relay list and the flood list approach. Each network edge leaf virtual tunneling endpoint 106, e.g., at the edge of the data center, is configured with an ARP reply relay feature that changes the destination MAC of the address resolution reply to a broadcast address (i.e., the broadcast address replaces the destination MAC address) and then floods the address resolution reply naked (unencapsulated) towards the edge device 102 associated with that virtual tunneling endpoint 106 (see FIGS. 1 and 2). Any time a network edge leaf virtual tunneling endpoint 106 receives an address resolution reply (a.k.a. ARP reply) destined to its VMAC (i.e., the virtual router MAC address, VRM or VARP-MAC of that NEL VTEP), the network edge leaf virtual tunneling endpoint 106 relays the address resolution reply to all the other remote data centers, using the broadcast address, via the edge device 102. Thus, the other remote data centers, including all of the virtual tunneling endpoints 106 in those data centers, are flooded with the address resolution reply.

This results in the interconnecting network 102, e.g., the data center interconnect, which connects the edge nodes of the data centers, learning the source MAC of the host sending the ARP reply. The network edge leaf virtual tunneling endpoints 106 of remote data centers learn the source MAC of the host sending the ARP reply and propagate this locally in the data center, e.g., using CVX™. And, the network edge leaf virtual tunneling endpoint 106 of each remote center will consume the ARP reply (which is destined to the broadcast address) and also head end replicate the ARP reply to the other virtual tunneling endpoints 106 in the local data center. The above-described ARP reply relay feature could be configured using a centralized control service such as CVX™ on the Vxlan control service, or directly on the network edge leaf virtual tunneling endpoint 106, in various embodiments.

Since the same VARP-MAC is used in both or all data centers (see, e.g., FIGS. 1 and 2), the learning of the VARP-MAC address will ping pong between local and remote data centers on Edge-1 and Edge-2 nodes (see FIG. 1). In order to reduce this churn, local static could be programmed for the VARP-MAC on both the Edge nodes (e.g., in edge devices 104 labeled Edge 1 and Edge 2 in FIG. 1) and make each edge device 104 point to the naked link towards the attached NEL VTEP (e.g., the network edge leaf virtual tunneling endpoints 106 labeled virtual tunneling endpoint 3 and virtual tunneling endpoint 6 in FIG. 1). No Edge nodes is expected to ever receive a packet (naked and unencapsulated or tunneled and encapsulated) with a destination of VARP-MAC, based on an assumption that each data center supports direct routing and hence should never leak such a packet to the Edge node.

The Edge nodes will age out the host MACs learned from the relayed ARP reply packets, unless there is two way traffic for the host. This will result in the Edge node flooding the packets destined to the host in the DCI network (e.g., interconnecting network 102 in FIGS. 1 and 2). On Edge nodes, increasing the MAC aging timeout from its default value should be considered, to remedy this situation.

Some advantages of the arp reply relay approach include that only the NEL VTEP or network edge leaf virtual tunneling endpoint 106 in a data center needs to be configured with the ARP reply relay feature. The configuration model is thus more scalable, as the number of virtual tunneling endpoints 106 in a data center has no impact on the feature configuration. One can freely add/delete non-NEL virtual tunneling endpoints 106 in a local data center or change their virtual tunneling endpoint IP addresses, with no changes to the network edge leaf virtual tunneling endpoint 106 or edge device 104. None of virtual tunneling endpoints 106 in a data center need to be leaked into the DCI WAN core, unlike the flood list approach explained above. Caveats include that the edge device 104 labeled Edge 1 should tunnel the overlay packet all the way to the edge device 104 labeled Edge 2 over the interconnecting network 102, e.g., DCI WAN in FIG. 1 (so the packet is decapped only at Edge 2 where it is forwarded naked to the network edge leaf virtual tunneling endpoint 106 labeled virtual tunneling endpoint 6 of data center 2) and vice versa. Otherwise any intermediate node decapsulating the overlay packet may see MAC move churn, if it learns the VARP-MAC. Any host replying to an ARP request originated by a virtual tunneling endpoint 106 in a remote data center, while trying to route a packet towards the host, will be learned by all the data centers.

Figure 5:
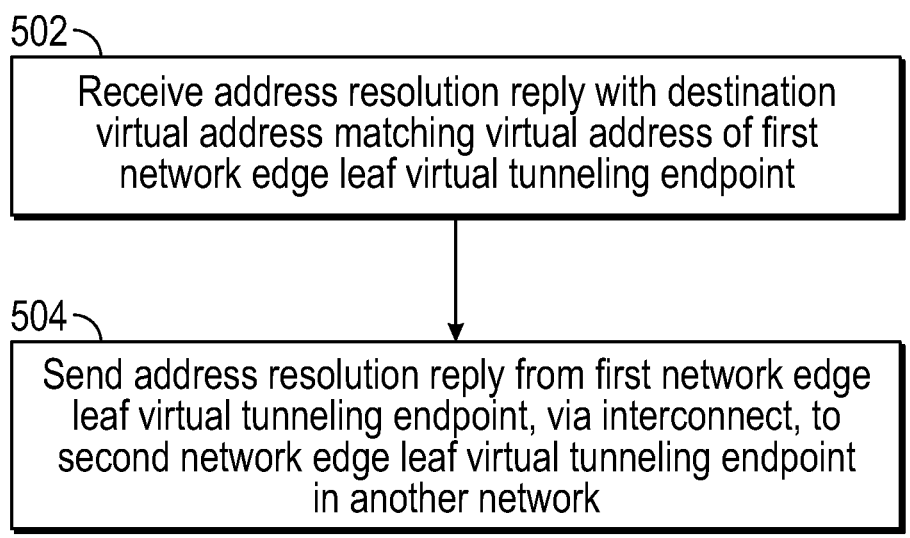
FIG. 5 is a method for address resolution in virtual extensible networks, which can be practiced in the overlay extension depicted in FIGS. 1-4 in accordance with some embodiments.

FIG. 5 is a method for address resolution in virtual extensible networks, which can be practiced in the overlay extension depicted in FIGS. 1-4. The method can be practiced by a processor and/or a network edge leaf virtual tunneling endpoint in a network that is connected by an interconnect to another network. In an action 502, an address resolution reply, with a destination MAC address matching a virtual address of a first network edge leaf virtual tunneling endpoint is received. For example, the first network edge leaf virtual tunneling endpoint could receive an ARP reply that has a DMAC that matches the VARP-MAC assigned to this and other members of a homogeneous overlay in which one network is connected to another network by an interconnect such as a data center interconnect or a wide area network. The two networks connected by the interconnect could be virtual local area networks or other types of networks.

In an action 502, the address resolution reply is sent from the first network edge leaf virtual tunneling endpoint, via the interconnect, to a second network edge leaf virtual tunneling endpoint in another network. For example, the first network edge leaf virtual tunneling endpoint could consult a remote flood list or an address resolution reply relay list, and forward the ARP reply over the interconnect to the second network edge leaf virtual tunneling endpoint, which is listed on the remote flood list or the address resolution reply relay list.

In versions that use remote flood lists, each network edge leaf virtual tunneling endpoint has its own remote flood list. The remote flood list has addresses of all virtual tunneling endpoints of other networks to which the respective network edge leaf virtual tunneling endpoint is connected by the interconnect. When sending the address resolution reply via the interconnect to other virtual tunneling endpoints, the network edge leaf virtual tunneling endpoint uses the remote flood list. Flooding to virtual tunneling endpoints of each of the other networks is thus performed by the sending network edge leaf virtual tunneling endpoint.

In versions that use address resolution reply relay lists, each network edge leaf virtual tunneling endpoint has its own address resolution reply relay list. The address resolution reply relay list has addresses of network edge leaf virtual tunneling endpoints in other networks to which the respective network edge leaf virtual tunneling endpoint is connected by the interconnect. When sending the address resolution reply via the interconnect to other network edge leaf virtual tunneling endpoints, the network edge leaf virtual tunneling endpoint uses the address resolution reply relay list. A receiving network edge leaf virtual tunneling endpoint, which receives such an address resolution reply via the interconnect, is responsible for flooding its own local network, for example using a local flood list. Local flooding is performed by head-end replication, in some embodiments. Such a local flood list can also be used to determine whether a source address of an address resolution reply is in that local network, in which case the address resolution reply should be forwarded via the interconnect. In some embodiments, the address resolution reply list can be used to determine whether a source address of an address resolution reply is on one of the other networks, in which case the address resolution reply should not be forwarded via the interconnect, as it has already arrived from there.

Remote flood list versions and address resolution reply list versions have in common that both the remote flood list and the address resolution reply list have addresses of network edge leaf virtual tunneling endpoints in the other networks. One difference is that the address resolution reply list for a specific network edge leaf virtual tunneling endpoint has only addresses of other network edge leaf virtual tunneling endpoints connected to the interconnect. The remote flood list for a specific network edge leaf virtual tunneling endpoint has addresses of all virtual tunneling endpoints in the other networks connected to the interconnect.

Figure 6:
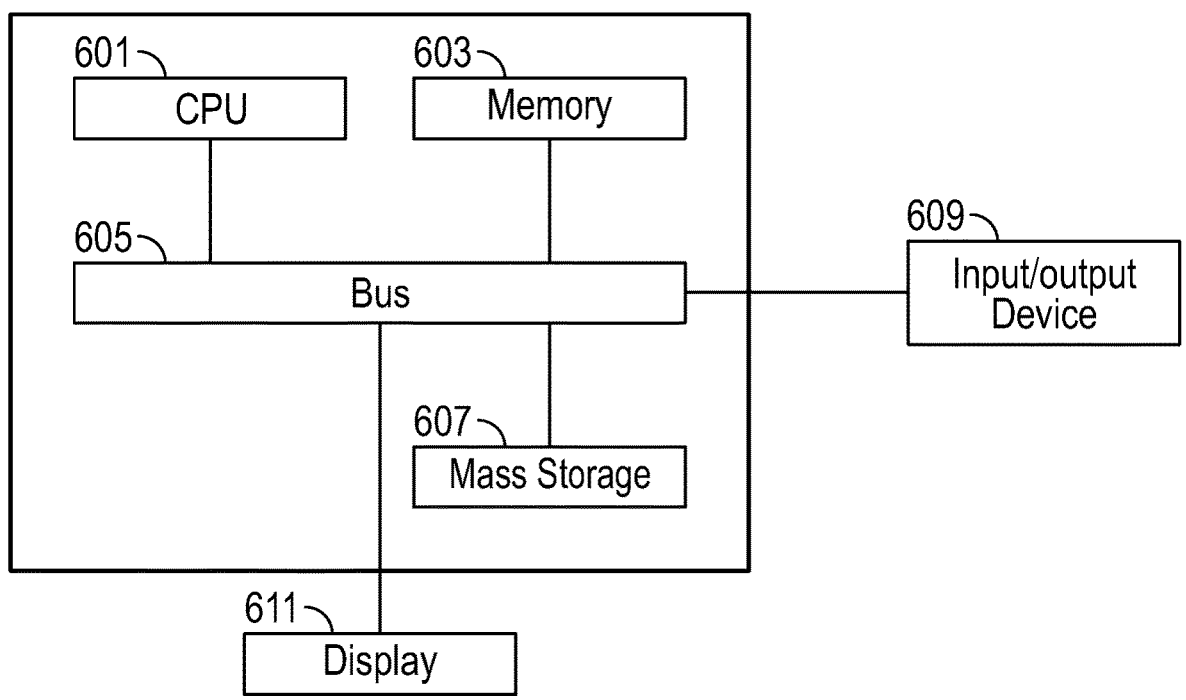
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for address resolution and forwarding address resolution replies in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A network element, comprising:
a tunneling endpoint having a virtual address;
the tunneling endpoint configured to receive an address resolution protocol (ARP) reply that has a destination media access control (DMAC) address matching a virtual ARP MAC (VARP-MAC) address of the tunneling endpoint and is from a network device in a first virtual network that includes the tunneling endpoint, wherein the VARP-MAC address is assigned to the tunneling endpoint through which the first virtual network and a further virtual network are interconnected, the further virtual network distinct from the first virtual network; and
the tunneling endpoint further configured to have a first list of addresses of virtual tunneling endpoints of the further virtual network and to utilize the first list to send the ARP reply via an interconnect to a further tunneling endpoint, having the VARP-MAC address assigned, in the further virtual network.

2. The network element of claim 1, further comprising:
the tunneling endpoint configured to have a second list having addresses of virtual tunneling endpoints of the first virtual network and to utilize the first and second lists when sending the ARP reply via the interconnect to the further tunneling endpoint.

3. The network element of claim 1, further comprising:
wherein the first list is an ARP reply relay list having an address of the further tunneling endpoint and to utilize the ARP reply relay list when sending the ARP reply via the interconnect to the further tunneling endpoint.

4. The network element of claim 1, wherein:
the first virtual network and the further virtual network are virtual extensible local area networks (VXLANs);
the interconnect is a wide area network (WAN) to which the first virtual network is coupled via the first tunneling endpoint and the further virtual network is coupled via the further tunneling endpoint; and
the virtual address of the tunneling endpoint is a virtual IP (Internet protocol) address, and the VARP-MAC address assigned to a virtual router MAC (VRM or VMAC) address of the tunneling endpoint.

5. The network element of claim 1, further comprising:
the tunneling endpoint further configured to flood the ARP reply with a broadcast address to all virtual tunneling endpoints in the further virtual network, via the interconnect, wherein such flooding includes sending the ARP reply with the broadcast address to the further tunneling endpoint.

6. The network element of claim 1, further comprising:
the tunneling endpoint further configured to change a DMAC address of the ARP reply to a broadcast address and flood the ARP reply unencapsulated towards an edge device associated with the tunneling endpoint.

7. The network element of claim 6, wherein use of the broadcast address results in flooding the ARP reply over the interconnect to at least one remote data center, including flooding all virtual tunneling endpoints in the remote data center.

8. A tangible, non-transitory, computer-readable media having instructions thereupon which, when executed by a processor, cause the processor to perform a method comprising:
receiving an address resolution protocol (ARP) at a tunneling endpoint, wherein the ARP reply has a destination media access control (DMAC) address that matches a virtual ARP MAC (VARP-MAC) address of the tunneling endpoint, and wherein the ARP reply is from a network device in a first virtual network that includes the tunneling endpoint, wherein the VARP-MAC address is assigned to the tunneling endpoint through which the first virtual network and a further virtual network are interconnected, the further virtual network distinct from the first virtual network;
sending the ARP reply via an interconnect to a further tunneling endpoint, having the VARP-MAC address assigned, in the further virtual network, wherein the further tunneling endpoint couples the interconnect to the further virtual network; and
adding a first list having addresses of one or more tunneling endpoints of one or more further virtual networks, including an address of the further tunneling endpoint, to the tunneling endpoint, wherein the sending the ARP reply via the interconnect to the further tunneling endpoint utilizes the first list.

9. The computer-readable media of claim 8, wherein the method further comprises:
adding a second list having addresses of one or more tunneling endpoints of the first virtual network, wherein the sending the ARP reply via the interconnect to the further tunneling endpoint utilizes the first and second lists.

10. The computer-readable media of claim 8, wherein the first list is an ARP reply relay list having addresses of one or more tunneling endpoints of one or more further virtual networks, including an address of the further tunneling endpoint, to the tunneling endpoint, wherein the sending the ARP reply via the interconnect to the further tunneling endpoint utilizes the ARP reply relay list.

11. The computer-readable media of claim 8, wherein the sending further comprises:
flooding the ARP reply, with a broadcast address, to an edge device, and thence to all tunneling endpoints in the further virtual network, via the interconnect.

12. The computer-readable media of claim 8, wherein the method further comprises:
changing the DMAC address of the ARP reply to a broadcast address; and
flooding the ARP reply with the broadcast address, unencapsulated, towards an edge device coupled with the tunneling endpoint, in the first virtual network, wherein the sending the ARP reply to the further tunneling endpoint is a result of the ARP reply having the broadcast address.

13. The computer-readable media of claim 8, wherein the method further comprises:
determining whether a source address of the ARP reply is within an ARP reply list in the tunneling endpoint, wherein the sending the ARP reply is responsive to determining that the source address of the ARP reply is not within the ARP reply list.

14. A processor-based method for address resolution in virtual extensible networks, comprising:
receiving, at a first tunneling endpoint an address resolution protocol (ARP) reply having a destination media access control (DMAC) address matching a virtual ARP MAC (VARP-MAC) address of the first tunneling endpoint, from a network device in a first virtual network that includes the first tunneling endpoint and the network device, wherein the VARP-MAC address is assigned to the tunneling endpoint through which the first virtual network and a second virtual network are interconnected, the second virtual network distinct from the first virtual network;
sending the ARP reply from the first tunneling endpoint, via the interconnect, to a second tunneling endpoint, having the VARP-MAC address assigned, in the second virtual network; and
adding a first list having addresses of tunneling endpoints of the second virtual network, including an address of the second tunneling endpoint, to the first tunneling endpoint, wherein the sending the ARP reply via the interconnect to the second tunneling endpoint utilizes the first list.

15. The method of claim 14, wherein the first list is an ARP reply relay list, having at least an address of the second tunneling endpoint, wherein the sending the ARP reply from the first tunneling endpoint to the second tunneling endpoint via the interconnect utilizes the ARP reply relay list in the first tunneling endpoint.

16. The method of claim 14, wherein:
each of the first virtual network and the second virtual network is a virtual extensible local area network (VXLAN);
the interconnect couples to the first virtual network via the first tunneling endpoint and couples to the second virtual network via the second tunneling endpoint;
the network device is a tunneling endpoint in the first virtual network;
the ARP reply is in response to an ARP request; and
the VARP-MAC address of the first tunneling endpoint and the VARP-MAC address of the second tunneling endpoint are the same as the VARP-MAC address of all tunneling endpoints in the first and second virtual networks, and the VARP-MAC address of the first tunneling endpoint is a virtual router MAC (VRM or VMAC) address.

17. The method of claim 14, further comprising:
flooding an ARP request via head-end replication in the second virtual network;
de-encapsulating the ARP request at the second tunneling endpoint;
sending the de-encapsulated address resolution request from the second tunneling endpoint, via the interconnect, to the first tunneling endpoint;
encapsulating, at the first tunneling endpoint, the ARP request as received via the interconnect; and
flooding the encapsulated address resolution request via head-end replication in the first virtual network, wherein the ARP reply is in response to the ARP request.

18. The method of claim 14, further comprising:
replacing the destination MAC address of the ARP reply with a broadcast address; and
sending the ARP reply, with the broadcast address but unencapsulated, from the first tunneling endpoint to an edge device coupled, at an edge of the first virtual network, to the interconnect, wherein sending the ARP reply from the first tunneling endpoint to the second tunneling endpoint via the interconnect is via the edge device.

19. The method of claim 14, further comprising:

flooding the ARP reply, with a broadcast address replacing the DMAC address of the ARP reply and with the ARP reply unencapsulated, towards the interconnect, wherein this results in flooding the ARP reply to the second virtual network, including all virtual tunneling endpoints in the second virtual network.

* * * * *